(12) United States Patent
Gutierrez

(10) Patent No.: US 7,565,070 B1
(45) Date of Patent: Jul. 21, 2009

(54) TELEPHONE VIBRATOR

(75) Inventor: Roman C. Gutierrez, Arcadia, CA (US)

(73) Assignee: Siimpel Corporation, Arcadla, CA (US)

( * ) Notice: Subject to any disclaimer, the term of this patent is extended or adjusted under 35 U.S.C. 154(b) by 416 days.

(21) Appl. No.: 11/391,871

(22) Filed: Mar. 28, 2006

Related U.S. Application Data

(63) Continuation-in-part of application No. 11/263,149, filed on Oct. 31, 2005.

(60) Provisional application No. 60/665,882, filed on Mar. 28, 2005, provisional application No. 60/657,261, filed on Feb. 28, 2005.

(51) Int. Cl.
*G03B 17/00* (2006.01)
*H04M 1/00* (2006.01)

(52) U.S. Cl. .................. 396/75; 396/429; 455/567

(58) Field of Classification Search .......... 396/281, 396/661, 75, 429; 348/208.3, 208.15, 373, 348/376; 455/567
See application file for complete search history.

(56) References Cited

U.S. PATENT DOCUMENTS

| 5,266,988 | A | * | 11/1993 | Washisu | 396/55 |
| 6,078,438 | A | * | 6/2000 | Shibata et al. | 359/819 |
| 6,418,330 | B1 | * | 7/2002 | Lee | 455/567 |
| 7,386,323 | B2 | * | 6/2008 | Chen et al. | 455/556.1 |
| 2002/0142798 | A1 | * | 10/2002 | Miyake | 455/556 |
| 2004/0110488 | A1 | * | 6/2004 | Komsi | 455/411 |
| 2006/0029379 | A1 | * | 2/2006 | Butterworth et al. | 396/89 |

* cited by examiner

*Primary Examiner*—Patrick J Assouad
*Assistant Examiner*—Autumn Parker
(74) *Attorney, Agent, or Firm*—Haynes and Boone, LLP

(57) ABSTRACT

A vibrator for cellular telephones and the like uses components of a camera. Thus, the need for a dedicated vibrator, and the cost associated therewith, are mitigated. A component of the camera can be moved so as to provide vibration. For example, a lens of the camera can be move back and forth rapidly by an actuator. The vibration can be used to indicate that the phone is ringing, for example.

16 Claims, 15 Drawing Sheets

TELEPHONE VIBRATOR

PRIORITY CLAIM

This patent application claims the benefit of the priority date of U.S. provisional patent application Ser. No. 60/665,882, filed on Mar. 28, 2005 and entitled CAMERA USED AS VIBRATOR pursuant to 35 USC 119. The entire contents of this provisional patent application are hereby expressly incorporated by reference.

This patent application is a continuation-in-part (CIP) patent application of U.S. patent application Ser. No. 11/263,149 filed on Oct. 31, 2005 and entitled LORENTZ ACTUATOR FOR MINIATURE CAMERA. U.S. patent application Ser. No. 11/263,149 claims the benefit of priority date of U.S. provisional patent application Ser. No. 60/657,261, filed on Feb. 28, 2005 and entitled AUTOFOCUS CAMERA. The entire contents of both this regular patent application and this provisional patent application are also hereby expressly incorporated by reference.

TECHNICAL FIELD

The present invention relates generally to electric motors and actuators. The present invention relates more particularly to the use of an autofocus and/or zoom motor or actuator of a miniature camera as a ring vibrator in a cellular telephone.

BACKGROUND

Cellular telephones are well known. Contemporary cellular telephones commonly have ring vibrators that can be used to announce incoming telephone calls. For example, such ring vibrators can be used during business meetings instead of audio ringing, so as mitigate disruption to the meeting when an incoming call is received.

However, such contemporary ring vibrators utilize a dedicated vibrator that must be provided at additional cost. Further, such dedicated vibrators undesirably add size and weight to a cellular telephone.

Miniature cameras are widely used in contemporary cellular telephones. Miniature camera can have motors or actuators that are used to move optical components, such as the lenses or lens assemblies that effect focus and/or zoom.

It is desirable to provide a ring vibrator that uses existing components of a miniature camera of the cellular telephone, such that a dedicated vibrator is not required.

BRIEF SUMMARY

A method and system for providing vibration, such as for vibration ring of a cellular telephone, are disclosed. According to one embodiment, a method for providing vibration comprises moving a component of a camera so as to cause the vibration. The component can be an optical component, such as a lens. The component can be moved back and forth rapidly, so as to produce desired vibration.

More particularly, according to one embodiment of the present invention, a cellular telephone comprises a camera, a movable component within the camera, means for moving the component, and means for controlling movement of the component so as to effect vibration of the cellular telephone. The movable component can be an optical component, such as a lens. The means for moving the component can be an actuator, such as a Lorentz actuator or a voice coil. The controller can be an electronic controller that facilitates reciprocating movement of the actuator.

The vibrator of the present invention can reduce the cost of a cellular telephone or the like by eliminating the need for a dedicated vibrator for use in providing ring vibration.

This invention will be more fully understood in conjunction with the following detailed description taken together with the following drawings.

Embodiments of the present invention and their advantages are best understood by referring to the detailed description

DETAILED DESCRIPTION OF THE INVENTION

A method and system for moving miniature components, such as the optical components of a camera for a cellular telephone, uses the Lorentz force to effect such movement. As those skilled in the art will appreciate, the Lorentz force is a magnetic force that is perpendicular to both the local magnetic field and the direction of motion of a charged particle (an electron). The magnitude of this force is given by the formula:

$$F = I \times BL_{\mathit{eff}}$$

where:

F is the force,

I is current,

B is the magnetic field strength, and $L_{\mathit{eff}}$ is the effective length of the conductor that carries the current I within the magnetic field B.

Figure 1:
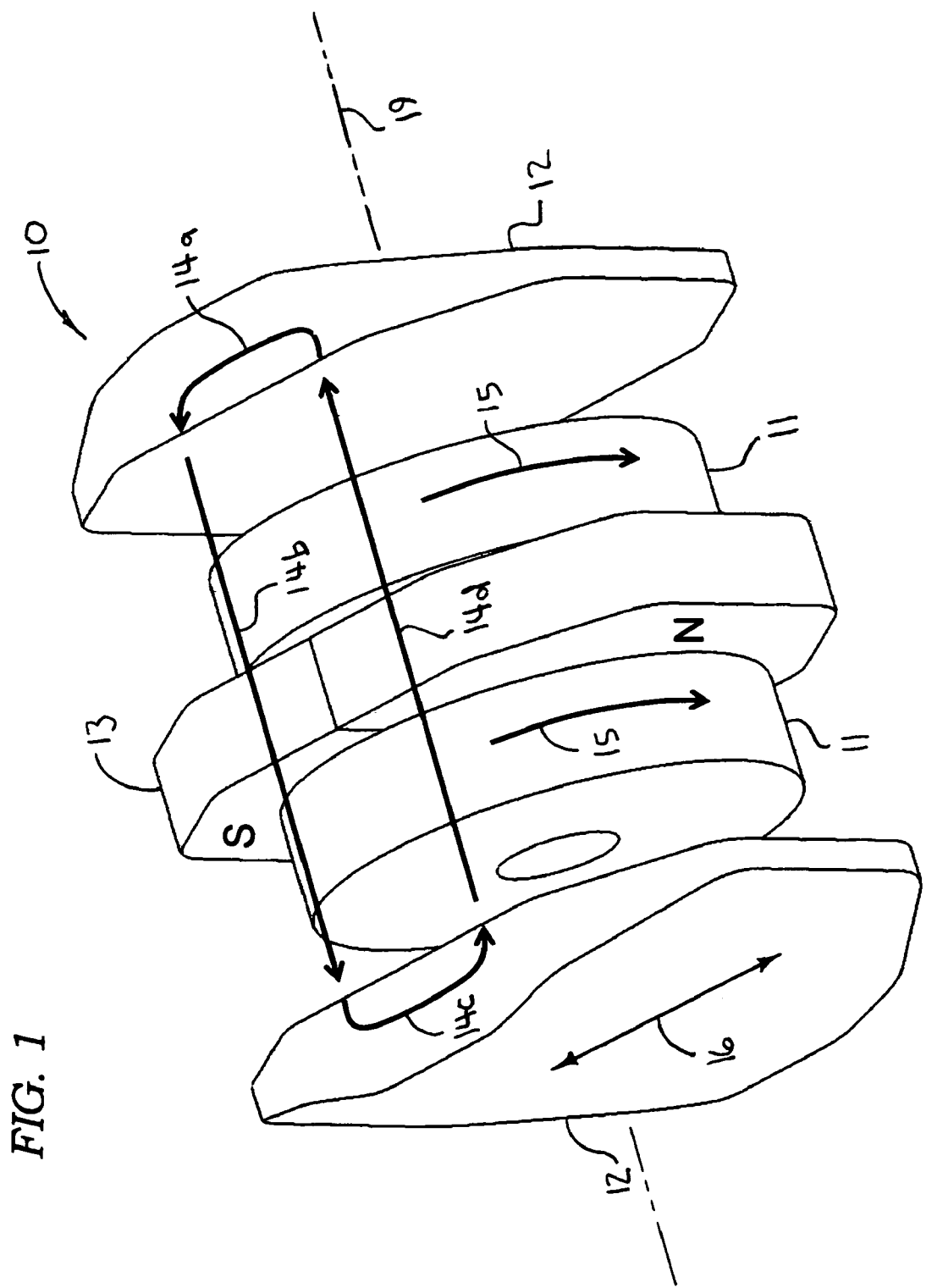
FIG. 1 is a schematic representation of a Lorentz actuator having a single magnet, two coils, and two flux guides (both outboard), and showing the magnetic flux and current flow thereof, according to an embodiment of the present invention.

Referring now to FIG. 1, an exemplary embodiment of the present invention is shown. A Lorentz actuator 10 can be defined by a plurality of coils 11 and at least one magnet 13. Optionally, a plurality of flux guides 12 can be included. Two coils 11 can be disposed intermediate two outboard flux guides 12. A single magnet 13 can be disposed intermediate coils 11.

Although the actuator is shown as comprising one magnet 13 and two coils 11, the actuator could alternatively comprise one coil 11 and two magnets 13. Indeed, as discussed in further detail below, various combinations of coils 11 and magnets 13 are possible. However, it can be advantageous to maintain a generally symmetric configuration of coils 11 and magnets 13. That is, coils 11 and magnets 13 should generally be symmetric about a plane that is perpendicular to a longitudinal axis 19 of the coil and magnet assembly and that is centered along axis 19. For example, coils 11 and magnets 13 can be generally symmetric about the plane that bisects magnet 13 of FIG. 1 (since magnet 13 is centered along axis 19). Such symmetric configurations tend to mitigate undesirable rotational forces, as also discussed in further detail below.

Magnet 13 provides a magnetic field having a direction such as that indicated generally by arrows 14a-14d. Thus, magnet 13 is oriented such that it forms a magnetic field whose flux passes substantially through coils 11.

Current, as indicated by arrows 15, can be caused to flow though coils 11 in either direction. Coils 11 are coupled such that current flows in the same direction through both. When current flows though coils 11, a Lorentz force results between coils 11 and magnet 13. If coils 11 are fixed in position (such as by attachment to a frame or enclosure) and magnet 13 is free to move, then coils 11 will tend to remain comparatively stationary while magnet 13 moves as indicted by arrow 16. The direction of the motion of magnet 13 is dependent upon the direction of current flow within coils 11, which is controllable. Thus, magnet 13 and any structures attached thereto (such as a stage and/or optical elements) will move in response to a current drive signal applied to coils 11.

Magnets 13 can alternatively be fixed in position and coils 11 can be free to move, such that current flow through coils 11 tends to cause coils 11 to move. In either instance, movable components, such as optical elements, can be attached or otherwise coupled to the moving elements (either magnets 13 or coils 11) so as to effect desire positioning of the movable components.

Figure 2:
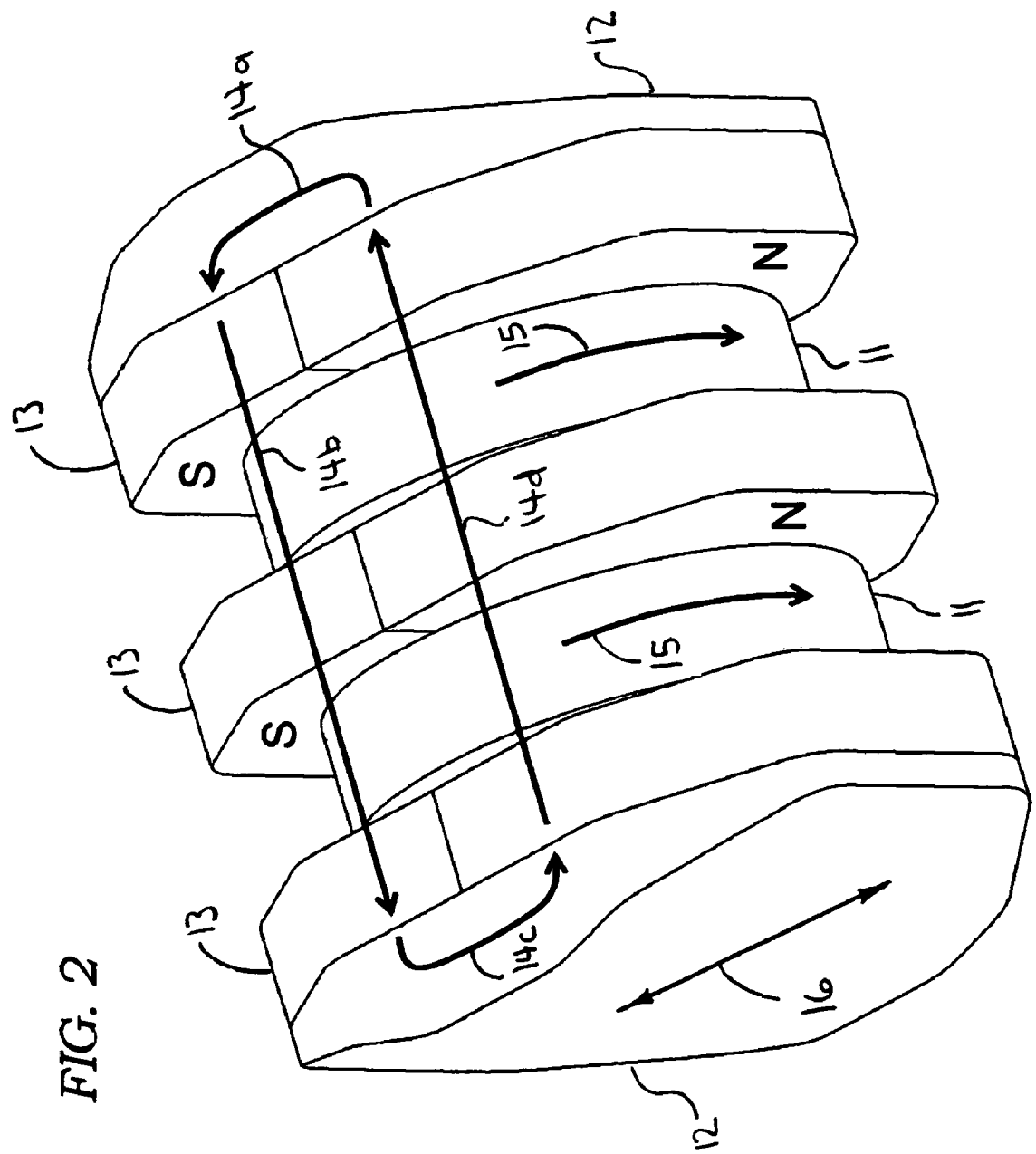
FIG. 2 is a semi-schematic representation of a Lorentz actuator having three magnets, two coils, and two flux guides (both outboard), and showing the magnetic flux and current flow thereof, according to another embodiment of the present invention.

Referring now to FIG. 2, two additional magnets 13 can be added in outboard positions, such as adjacent flux guides 12. Additional magnets 13 increase the flux flow through coils 11 and thus enhance the power and efficiency of the Lorentz actuator.

Figure 3:
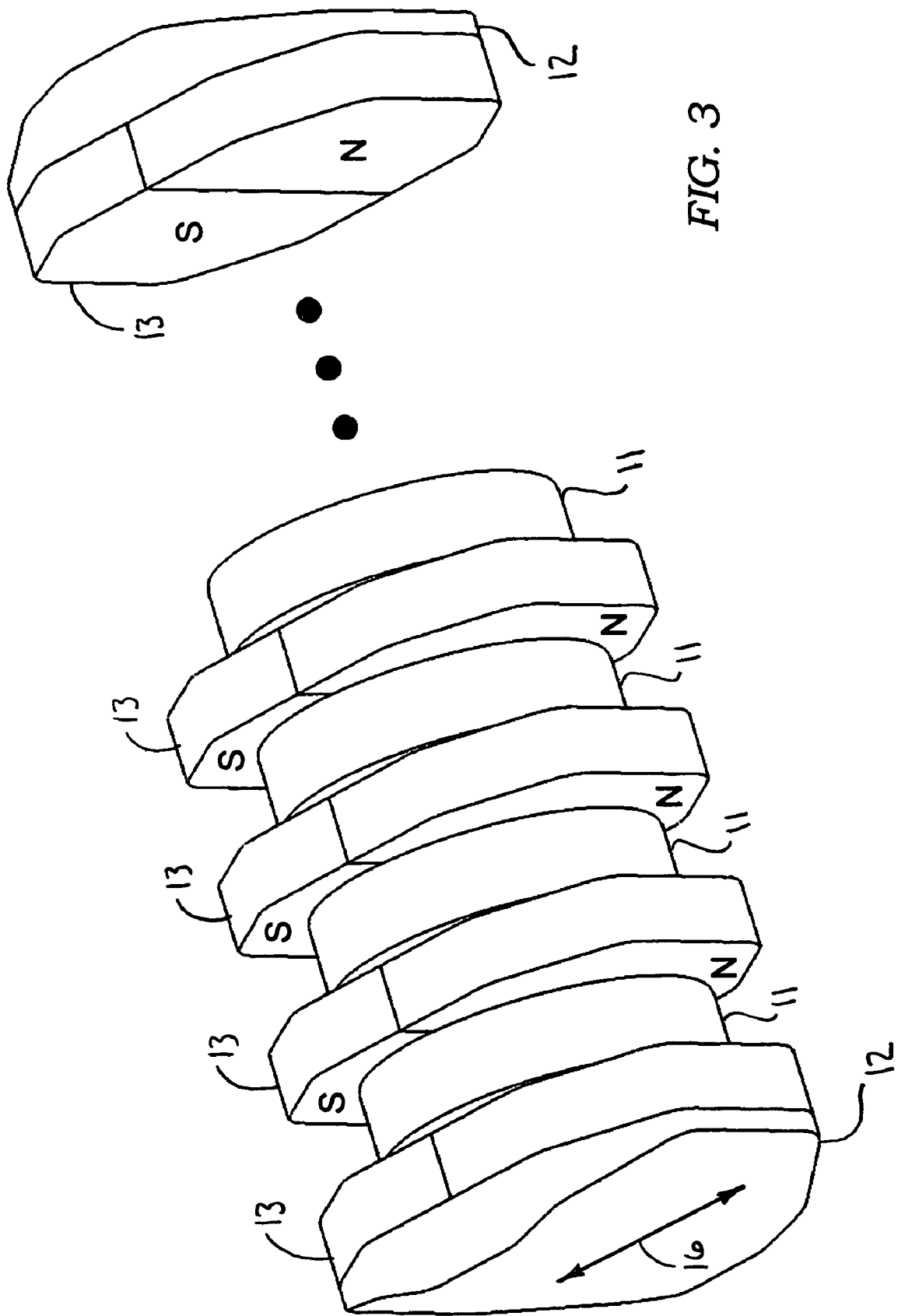
FIG. 3 is semi-schematic representation of a Lorentz actuator having an arbitrary number of magnets, an arbitrary number of coils, and two flux guides (both outboard), according to another embodiment of the present invention.

Referring now to FIG. 3, any desired number of coils 11 and magnets 13 can be used, as indicated by the ellipsis. Typically, coils 11 and magnets 13 will be configured in an alternating fashion. There can be one more coil 11 than the number of magnets 13 (as shown in FIG. 1) or one more magnet 13 than the number of coils 11 (as shown in FIGS. 2 and 3). This unequal number of coils 11 and magnets 13 can be used to obtain symmetry (as shown in FIGS. 1-3).

However, the configuration of the magnets 13 and the coils does not have to be alternating and the number of coils 11 can relate to the number of magnets 13 in any other manner. Indeed, symmetry can be obtained with an equal number of coils 11 and magnets 13 or with a great disparity between the number of coils 11 and magnets 13. For example, symmetry can be obtained by positioning two coils 11 together (side-by-side or adjacent one another in the center) and by placing two magnets 13 outboard thereof—one on either side of coils 11. As a further example, symmetry could be obtained by positioning four coils 11 together (side-by-side at the center) and by placing three magnets on each side thereof (for a total of six magnets 13). Thus two or more coils 11 can be placed side-by-side with no intervening magnets 13 and two or more magnets 13 can be placed side-by-side with no intervening coils 11. Thus, those skilled in the art will appreciate that many different symmetric configurations of coils 11 and magnets 13 are possible.

With any configuration of coils 11 and magnets 13, flux guides 12 can optionally be added. Typically, flux guides 12 will be outboard of the outermost magnets 12 or coils 11. However, flux guides 12 can be at any other desired location that tends to enhance flux through coils 11. Further, the flux guides 12 can have any desired shape or configuration and thus do not have to be configured as shown in the figures.

Figure 4:
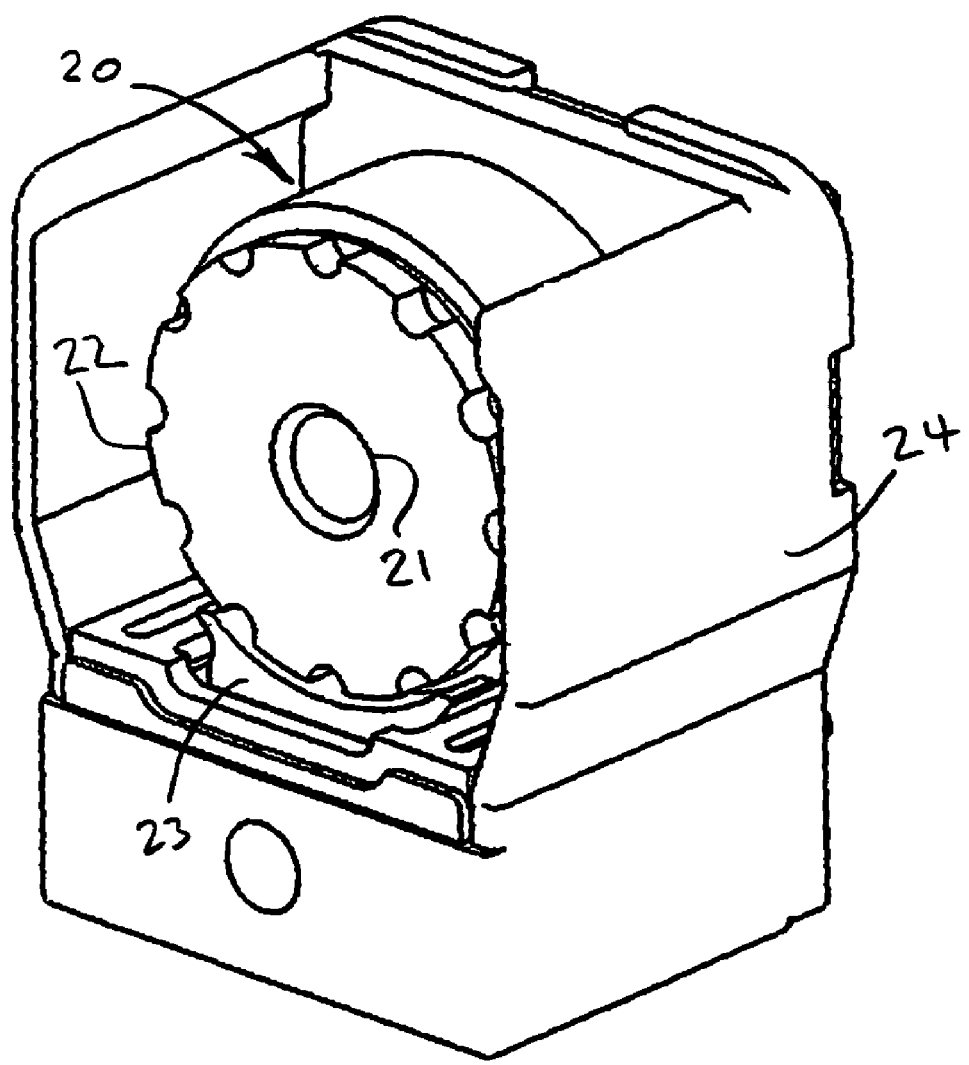
FIG. 4 is a semi-schematic, perspective view of an optics assembly of a miniature camera having a Lorentz actuator for moving a focusing lens thereof, according to one embodiment of the present invention.
Figure 5:
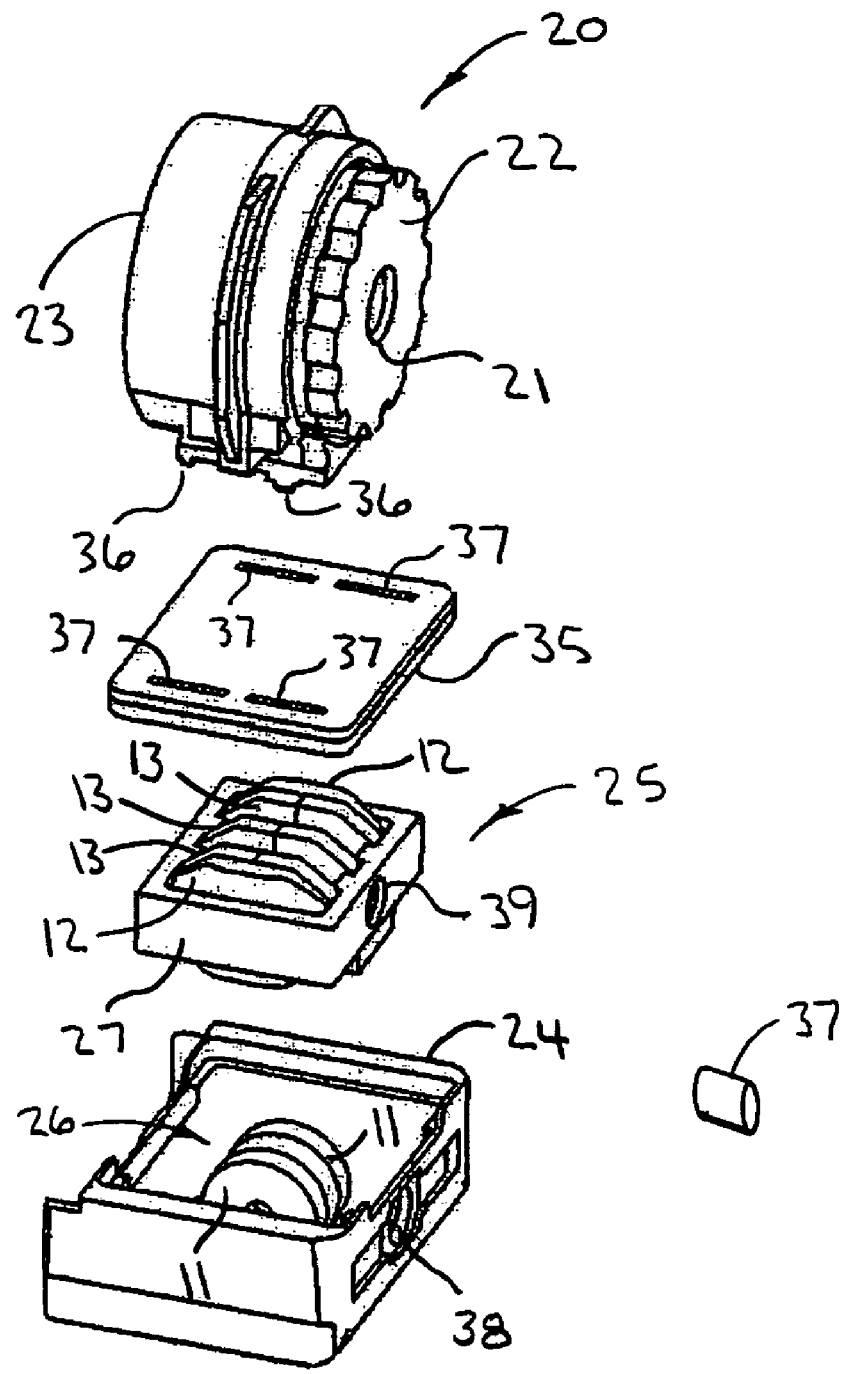
FIG. 5 is a semi-schematic, exploded view of the optics assembly of FIG. 4, showing components of the Lorentz actuator thereof.

Referring now to FIGS. 4 and 5, an actuator formed according to one embodiment of the present invention can be used to move elements of a miniature camera optics assembly 20. Optics assembly 20 can comprise, for example, a focusing lens 21 that is held by a lens holder 22. Lens holder 22 is attached, such as via threads, to a lens mount 23. Lens mount 23 can be caused to move linearly by a Lorentz actuator of the present invention. A housing 24 can generally surround the components of optical assembly 20. Focusing lens 21 can focus an image upon an imaging sensor (not shown).

Alternatively, optics assembly 20 can comprise a zoom lens, image stabilization elements, or any desired combination of focusing lens, zoom lens, image stabilization element and/or other optical elements. For example, a Lorentz actuator of the present invention can be used to move the blade or blades or a shutter or iris. One or more actuators can be used to move any combination of such lenses and/or other elements, as desired.

The actuator comprises a magnet assembly and a coil assembly 26. Magnet assembly 25 comprises a frame 27 that holds magnets 13 (which as shown in FIG. 5 include one central magnet and two outboard magnets in the configuration of FIG. 2) and any flux guides 12 in place with respect to one another. Coil assembly 26 can comprise two coils 11 (best shown in FIGS. 6, 11, and 12).

Magnet assembly 25 can be attached to a stage 35 such that movement of magnet assembly 25 results in like movement of stage 35. Stage 35 is attached to lens mount 23. For example, feet 36 of lens mount 23 can be received within openings 37 of stage 35. Feet 36 can be adhesively bonded, ultrasonically welded, or otherwise permanently attached to stage 35. Thus, linear movement of magnet assembly 25 results in linear movement of lens 21, such as to effect focusing of a miniature camera.

Optionally, a biasing spring 37 can be inserted through spring aperture 38 and placed into contact with spring seat 39 so as to bias magnet assembly 25 (and consequently lens 21) toward one end of housing 24. Biasing lens 21 toward one end of housing 24 such that it moves to a known position when current is not flowing through coils 11 can advantageously be used to provide a known location of lens 21 on power up and also to provide a comparatively stable position of stage 35 that enhances resistance to mechanical shock. For example, lens 21 can be biased by spring 37 into either the infinity focus or closest focus position thereof.

Thus, lens 21 can be biased by spring 37 so as to effectively provide focus at infinity when no current flows through coils 11. Such biasing generally tends to minimize the travel required by lens 21 to effect focus, on average. It also provides a more desirable failure mode with respect to optics assembly 20, since a failure is thus more likely to result in lens 20 becoming fixed at infinity focus, where it is more likely to be most useful. That is, if the Lorentz actuator fails, then lens 20 will remain in the infinity focus position due to spring 37, and will thus tend to remain useful.

Figure 6:
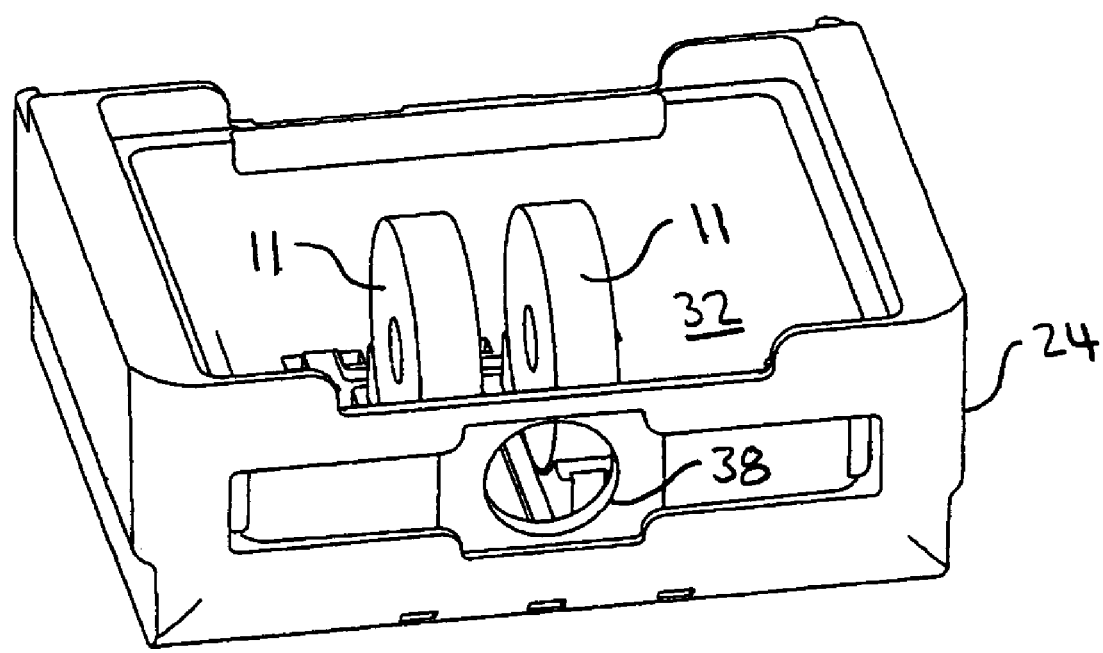
FIG. 6 is a semi-schematic, enlarged, perspective view of the lower portion of the optics assembly of FIG. 5, showing the coils of the Lorentz actuator thereof.

Referring now to FIG. 6, coils 11 can be mounted to a floor 32 of housing 24. Thus, coils 11 are fixed in position with respect to housing 24 such that it is magnet assembly 25 that moves in response to current flow through coils 11.

Figure 7:
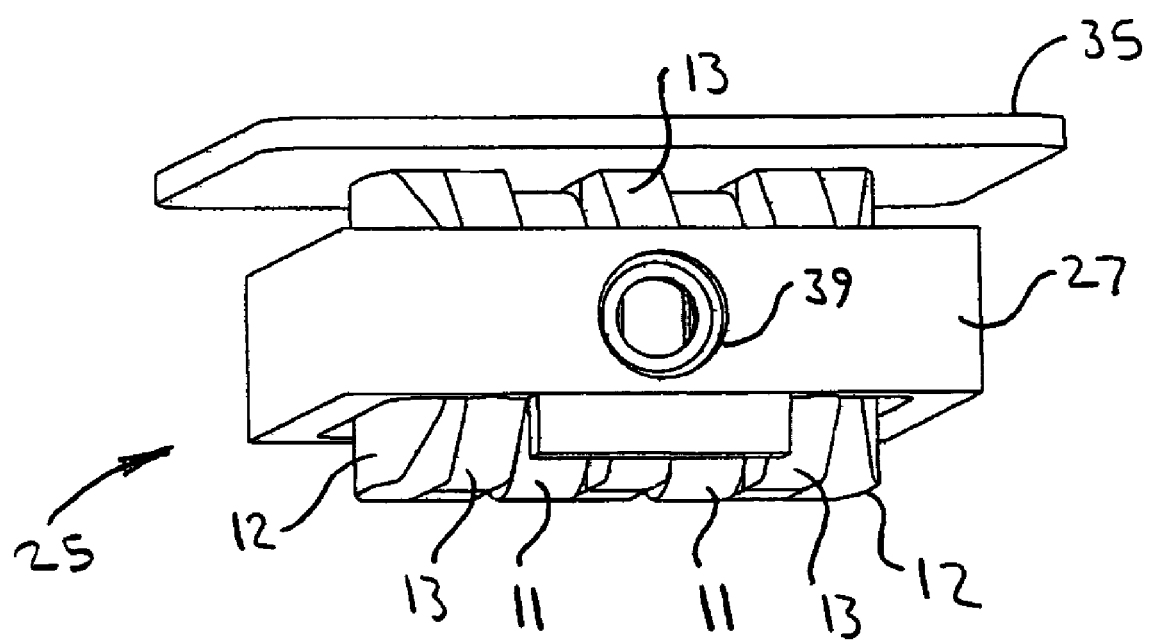
FIG. 7 is a semi-schematic, perspective view of the Lorentz actuator of FIG. 5, showing the coils in place relative to the magnets thereof.

Referring now to FIG. 7, magnet assembly 25 and stage 35 are shown with coils 11 in place with respect thereto. Again, since coils 11 are attached to housing 24, it is magnet assembly 25 (and consequently stage 35, as well as lens 21 attached thereto) that moves when current flows through coils 11.

Figure 8:
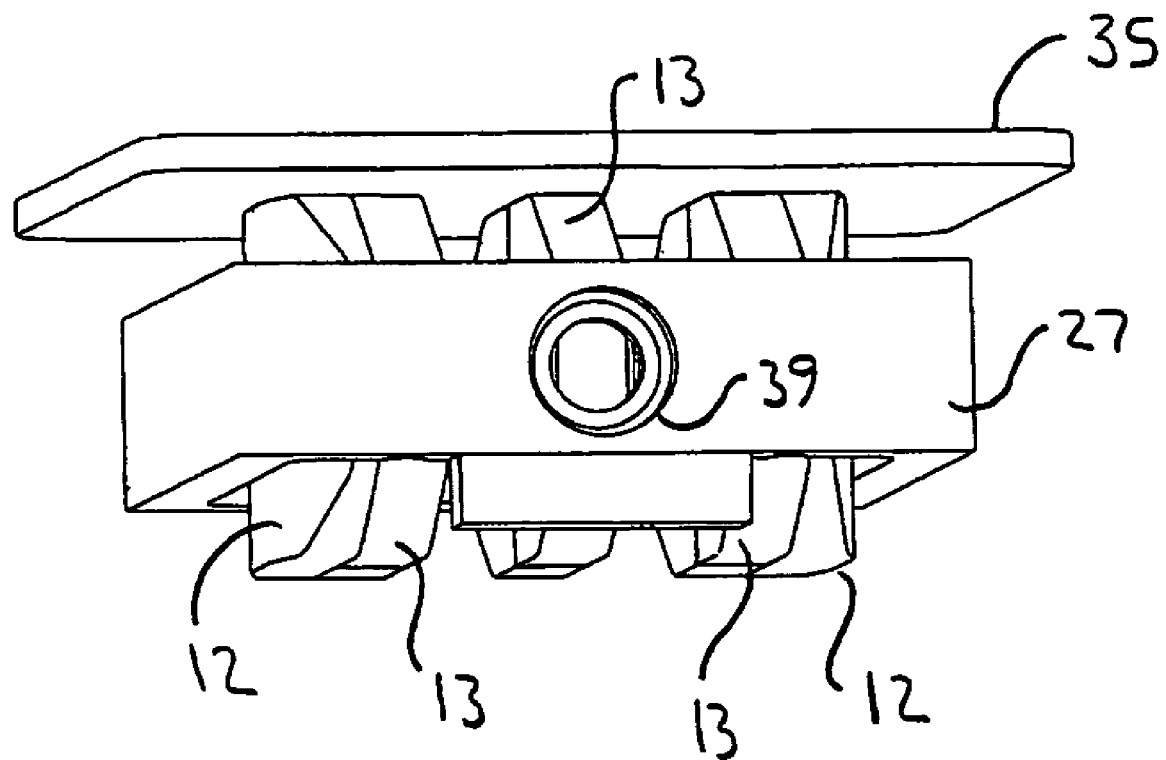
FIG. 8 is a semi-schematic, perspective view of the Lorentz actuator of FIG. 7, showing the coils removed therefrom so as to better show the magnet assembly thereof.

Referring now to FIG. 8, coils 11 are shown removed from the assembly of FIG. 7 to better show the magnets 13 thereof. Flux guides 12 tend to make the magnetic field formed by magnets 13 more uniform, especially proximate coils 11. Flux guides 12 also tend to mitigate undesirable fringe effects whereby outer portions of the magnetic field do not contribute to the Lorentz force that effects movement of lens 21. That is, flux guides 12 tend to concentrate the flux in the space occupied by coils 11, so as to enhance the magnetic field's effectiveness for use in causing motion in response to current flow in coils 11. The use of multiple coils 11 and magnets 13 also tends to mitigate undesirable fringe effects.

Figure 9:
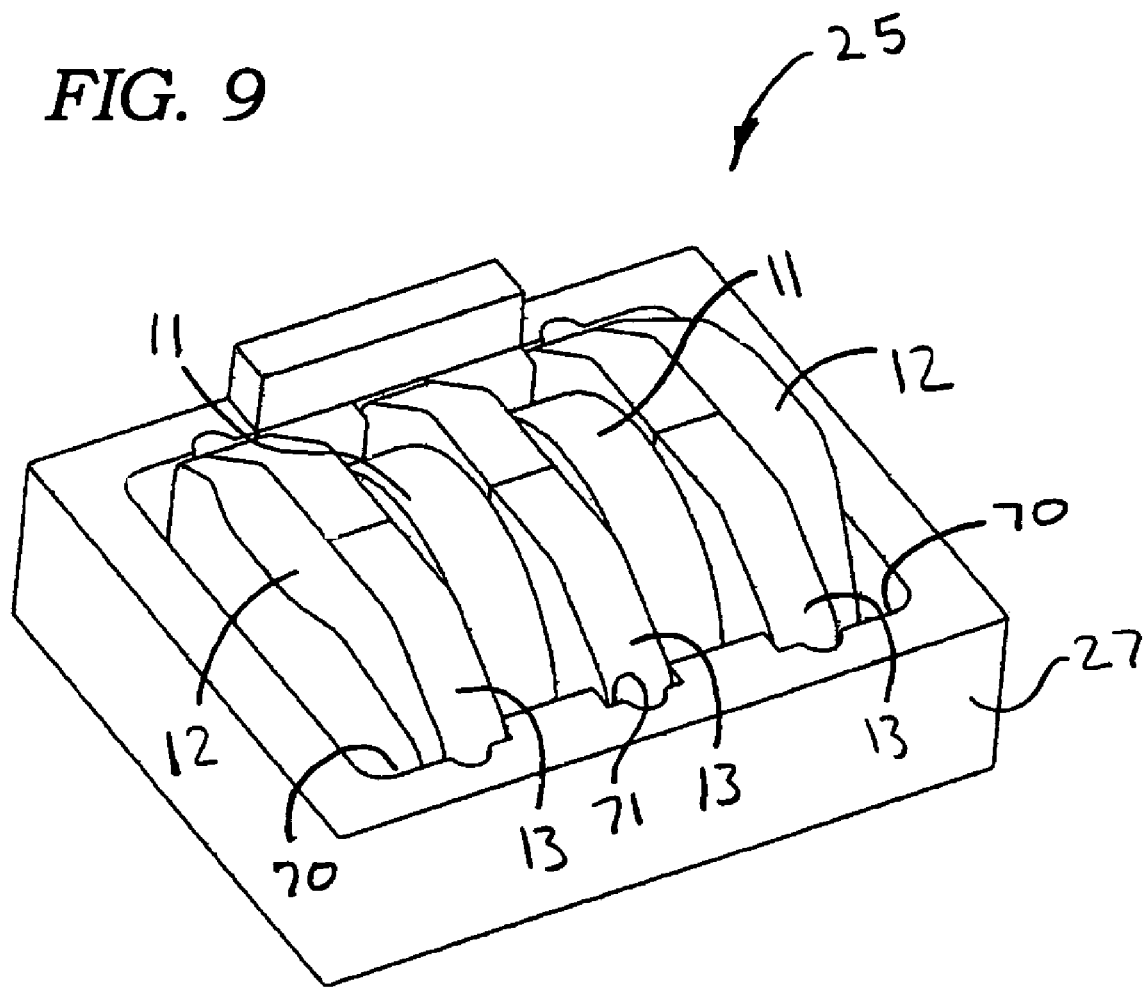
FIG. 9 is a semi-schematic, top perspective view of the magnet assembly of FIG. 7, showing the stage removed therefrom.

Referring now to FIG. 9, magnet assembly 25 is shown with coils 11 in place and with stage 35 removed therefrom. The relative positioning of coils 11 with respect to magnets 13 can be seen. Further, outboard slots 70 and inboard slots 71 are configured so as to hold magnets 13 in the desired relative positions. As those skilled in the art will appreciate, outboard magnets 13 are oriented such that they repel one another. Outboard 70 and inboard 71 slots help prevent magnets 13 from moving undesirably away from one another due to such repulsion. Optionally, magnets 13 can be adhesively bonded or otherwise held in place. Any combination of slots and other means for holding magnets 13 in place can be used.

Figure 10:
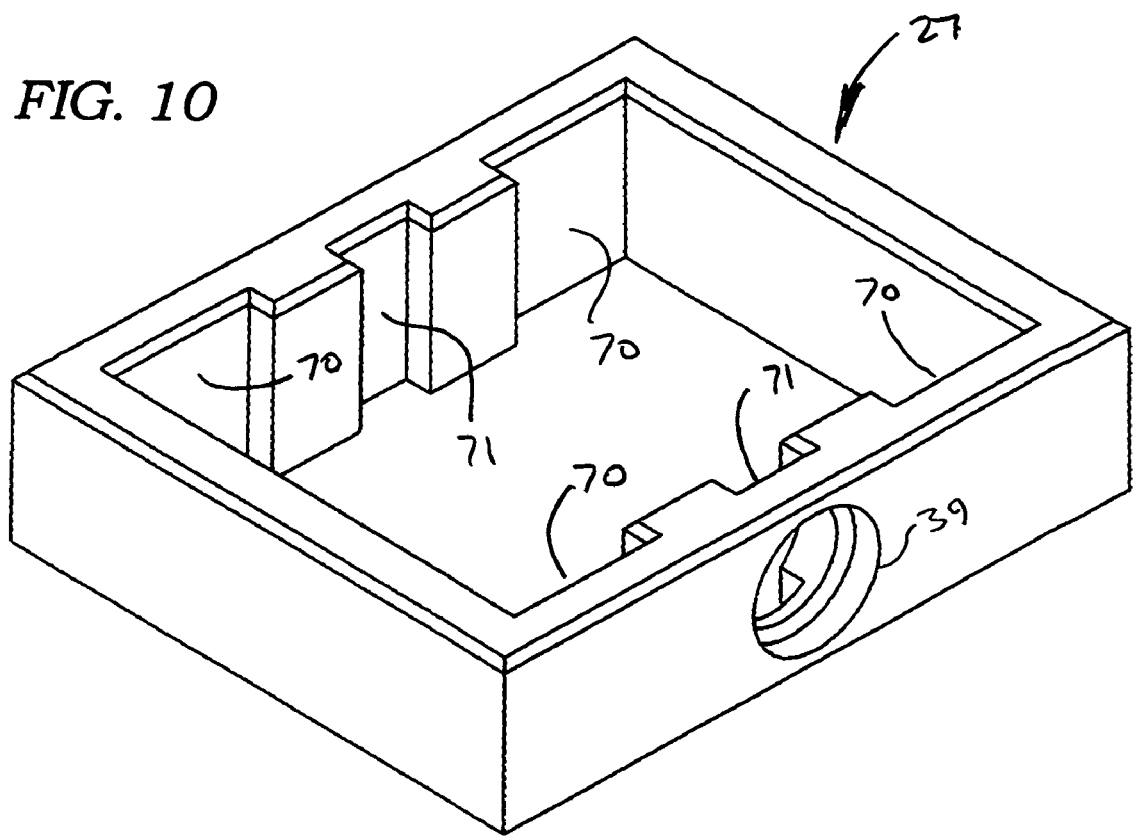
FIG. 10 is a semi-schematic, top perspective view of the frame of the magnet assembly of FIG. 9.

Referring now to FIG. 10, frame 27 of magnet assembly 25 is shown with magnets 13 and flux guides 12 removed therefrom. Frame 27 can be formed of various non-ferrous materials such a plastic or aluminum. The use of a non-ferrous material helps to maintain the magnetic field proximate the magnets 13, where it is more effective in producing the desired Lorentz force upon coils 11 when current flows through coils 11.

Figure 11:
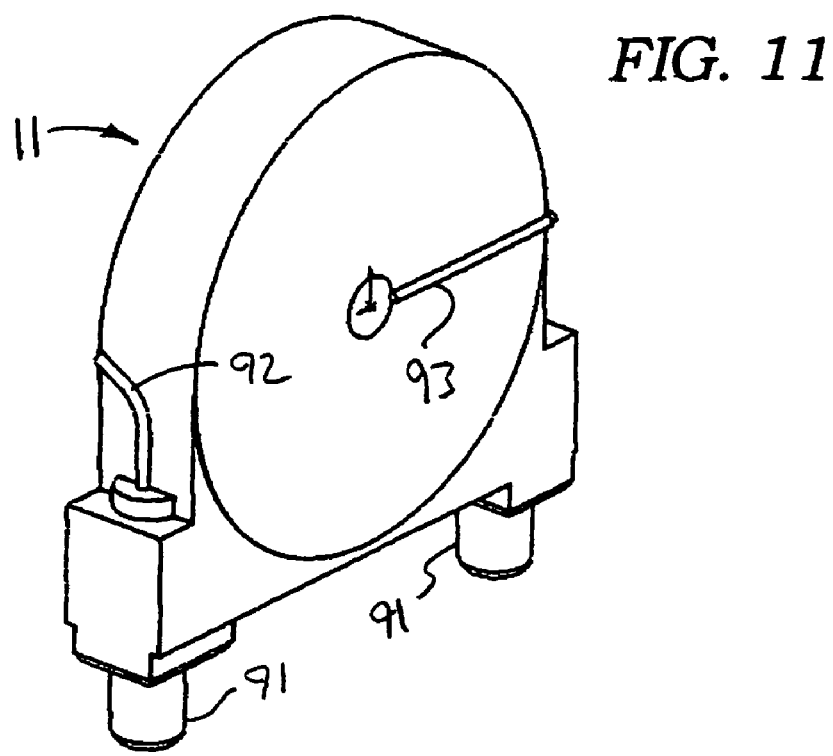
FIG. 11 is a semi-schematic, perspective view of a coil of the Lorentz actuator of FIG. 5.
Figure 12:
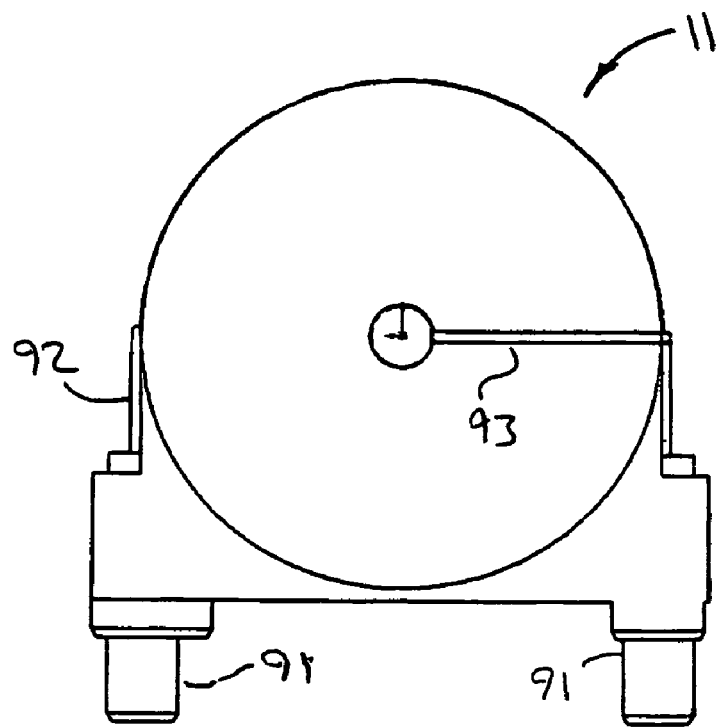
FIG. 12 is a semi-schematic, front view of the coil of FIG. 11.

Referring now to FIGS. 11 and 12, each coil 11 can comprise two feet 91 that are used both to mount each coil 11 to floor 32 of housing 24 and to provide electrical connection to coils 11. Thus, feet 91 can be used to mount coils 11 by inserting feet 91 into complementary holes in floor 32 of housing 24 (as shown in FIG. 5). Leads 92 and 93 provide electrical communication between feet 91 and the windings of coils 11.

Figure 13:
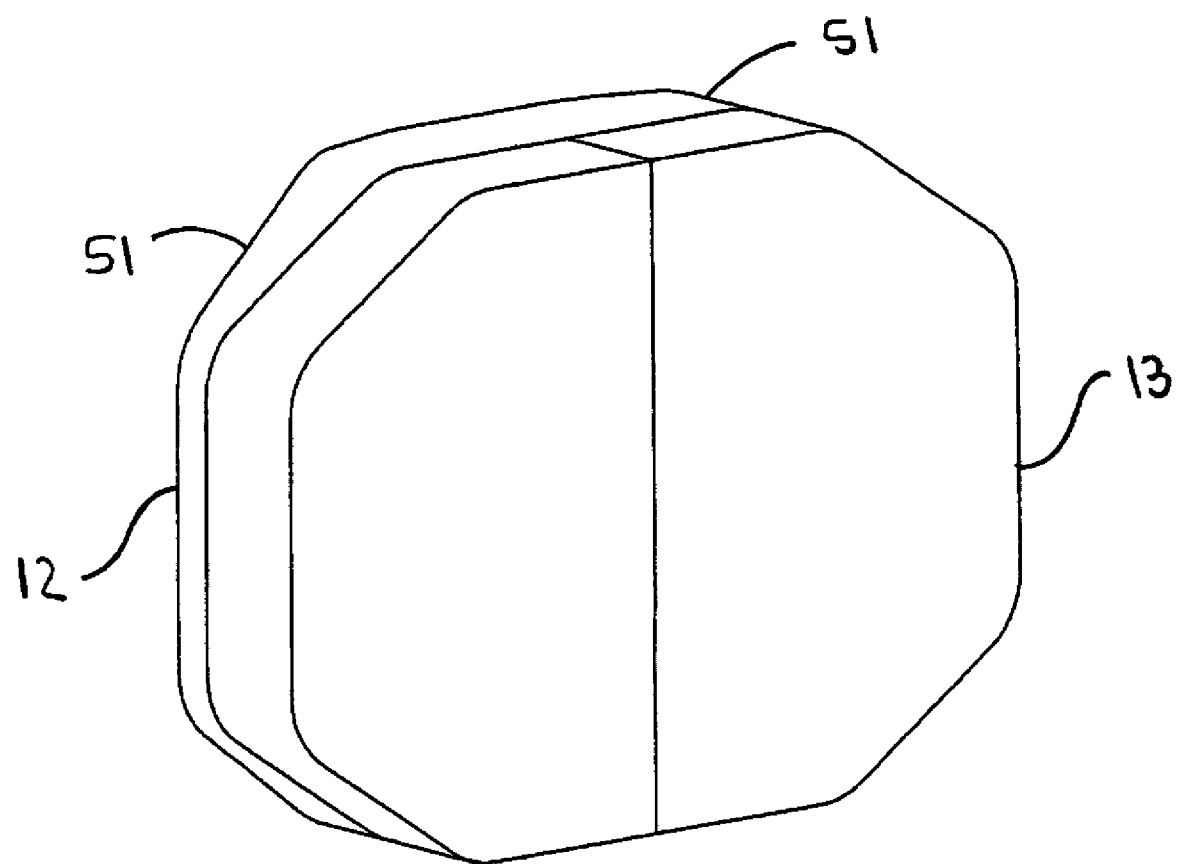
FIG. 13 is a semi-schematic, perspective view of a magnet assembly (which includes the magnet and the flux guide) of the Lorentz actuator of FIG. 5.

Referring now to FIG. 13, each outboard flux guide 12 can comprise a single plate formed of a ferrous material. Outboard flux guides 12 tend to concentrate the flux of the magnetic field (FIGS. 1 and 2) where it more effectively facilitates the generation of a Lorentz force due to current flow in coils 11. The weight of outboard flux guides 12 is mitigated by forming chamfers 51 thereon. Chamfers 51 are advantageously formed such that they tend to have minimal adverse impact upon each flux guide's ability to concentrate flux though coils 11. Thus, the coercive field of outboard magnets 13 is enhanced while mitigating the weight of magnet assembly 25. The outboard flux guides 12 and any optional inboard flux guide(s) can be formed of a ferrous material with high saturation, such as cold rolled steel.

Figure 14:
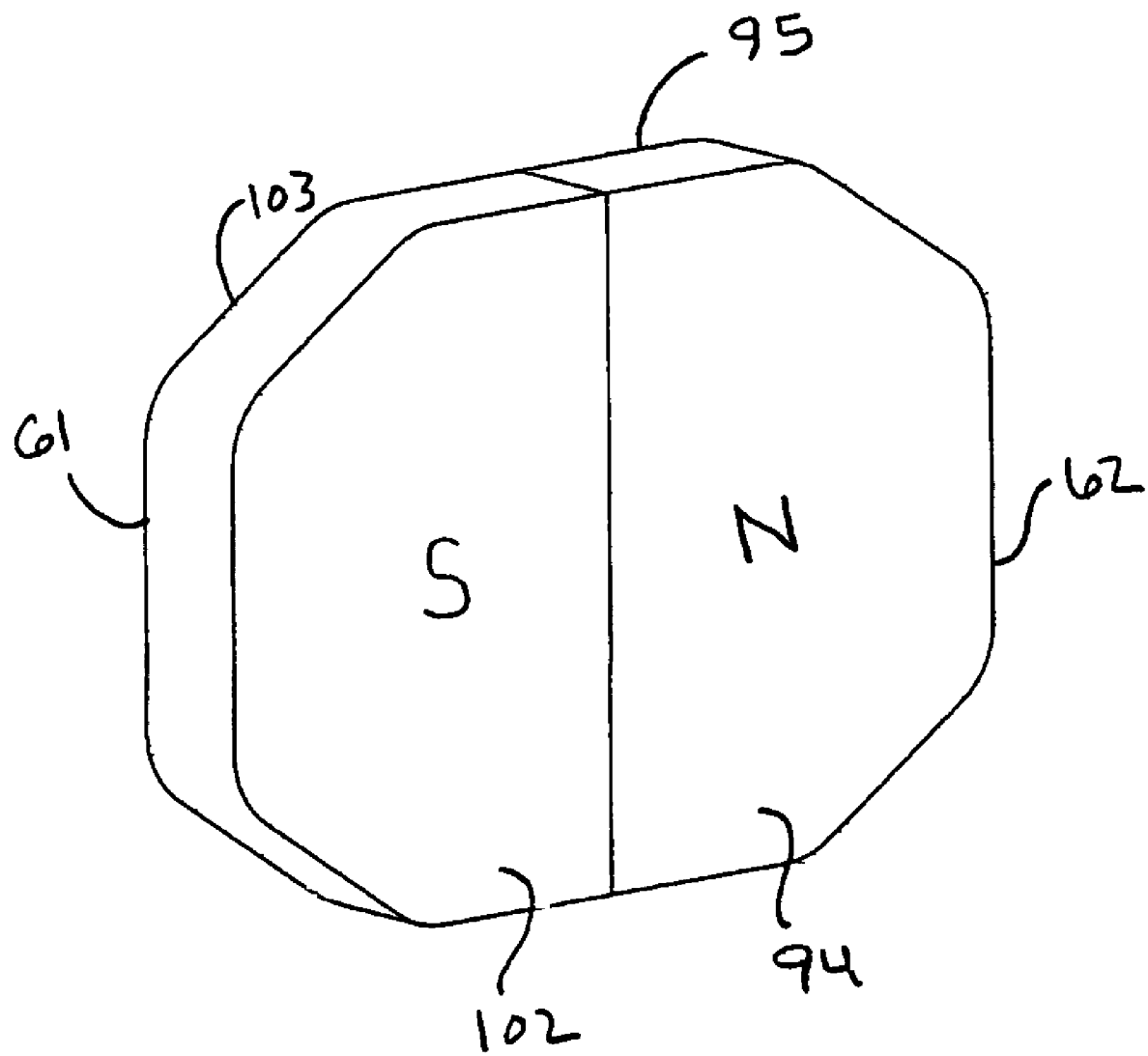
FIG. 14 is a semi-schematic, perspective view of a magnet of FIG. 5.

Referring now to FIG. 14, magnets 13 can be formed of two separate magnetic elements, 61 and 62, with the poles thereof oriented such that a generally continuous loop of magnetic flux is formed through coils 11 by magnetic assembly 25. For example, magnetic element 61 can be formed such that a south pole is defined on one face 102 thereof and a north pole is defined on the opposite face 103 thereof. Similarly, magnetic element 62 can be formed such that a north pole is defined on one face 94 and a south pole is defined on the opposite face 95 thereof.

Figure 15:
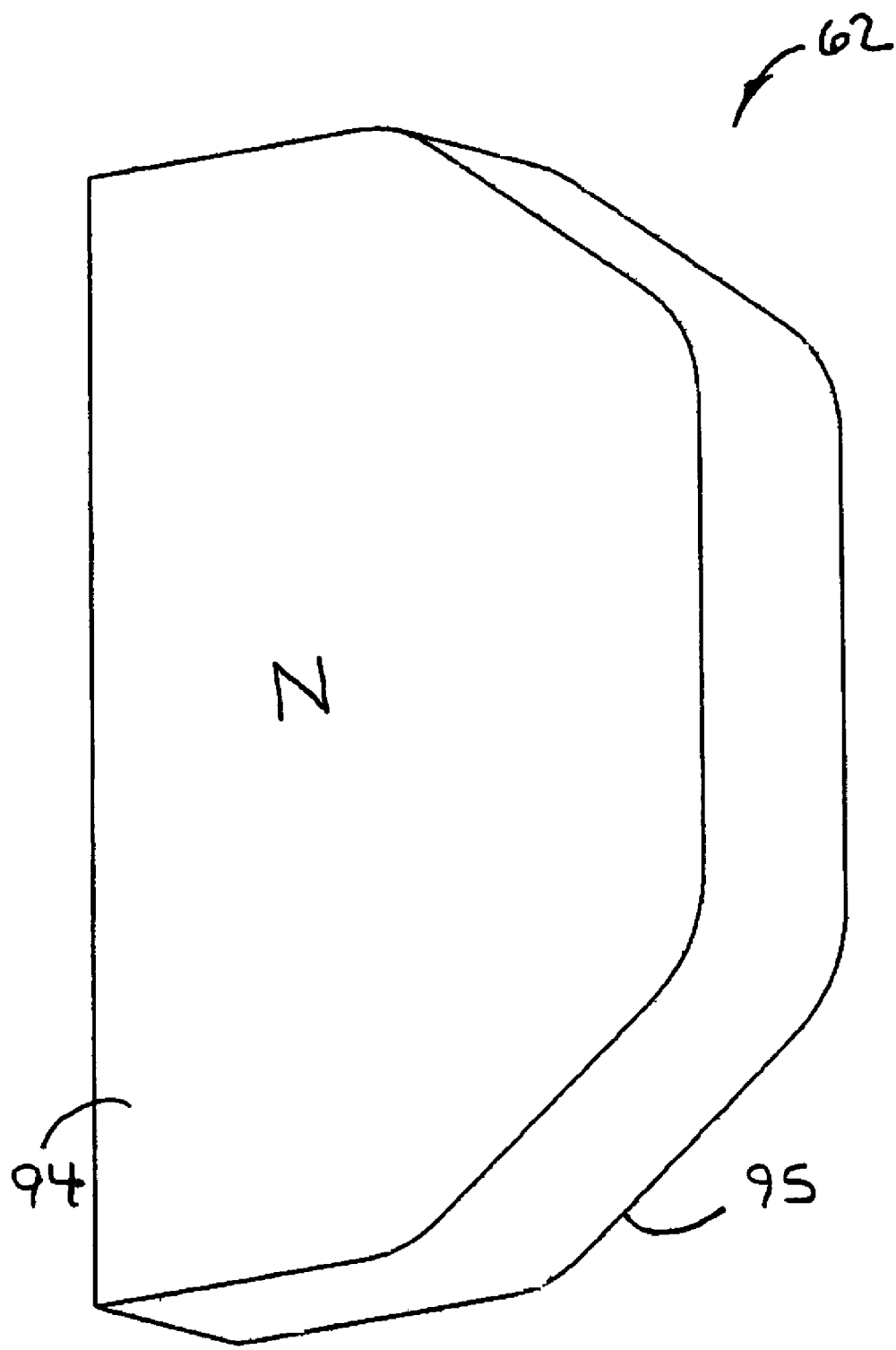
FIG. 15 is a semi-schematic, perspective view of one magnetic element of the magnet of FIG. 14.

Referring now to FIG. 15, a single magnetic element 62 (which is itself a magnet) is shown with the complimentary magnetic element 61 removed therefrom. Each magnet 13 can be formed of two such complimentary magnetic elements 61, 62. Each magnetic element 61 can optionally be adhesively bonded or otherwise attached to its complimentary magnetic element 62 to form a complete magnet 13, as shown in FIG. 14. Each magnetic element 61, 62 can comprise a NdFeB magnet. Alternatively, each magnet 13 can be formed from a single element that is half polarized in one direction and half polarized in the opposite direction, so that the magnetic field configuration is substantially similar to a magnet 13 formed from two magnetic elements 61 and 62.

The configuration of magnets 13 and coils 11 shown in FIGS. 5-15 tends to provide minimal gap distance between magnets 13, efficient routing of flux from magnets 13 through coils 11, optimal thickness of magnets 13 considering weight and volume versus force tradeoffs, optimal thickness of coils 11 considering weight and volume versus force tradeoffs, optimal magnet 13 thickness versus coil 11 thickness, optimal overall size and weight versus force tradeoffs, and optimal coil 11 radius considering uniformity of the ratio of force to current along the actuator's range of travel. Compared to Lorentz actuators of similar volume, but having only a single coil, Lorentz actuators of the present invention that have a plurality of coils provide more force for a given amount of current, more force for a given input power, and better uniformity of the force to current ratio over the actuator's travel.

Further, the configuration of coils 11 and magnets 13—more particularly the symmetric and spaced apart configuration thereof—substantially inhibits undesirable torquing of stage 35 (and consequently of lens 21). That is, both outboard magnets 13 tend to experience substantially the same force thereon such that linear movement of stage 35 results from current flow through coils 11 and such that resulting rotational forces tend to be mitigated. Thus, as compared to other possible configurations of Lorentz actuators, such as those having only a single coil and a single magnet and other asymmetrical configurations, Lorentz actuators of the present invention provide more linear movement of the moving element and are less likely to bind or wear undesirably.

Any desired number of magnets and coils may be used, as long as there is effectively a plurality of at least one (either magnets or coils) thereof, so as to facilitate symmetrical configuration and thereby inhibit the undesirable application of torque to a structure driven by the actuator. Configuring the Lorentz actuator of the present invention such that two coils and three magnets are used, as shown in the exemplary embodiment of FIG. 2, provides a lightweight and volume efficient actuator that can generate a comparatively enhanced amount of force for a device of its size, while mitigating the generation of undesirable torque due to its symmetric construction (which is based upon the use of plural coils and magnets).

Figure 16:
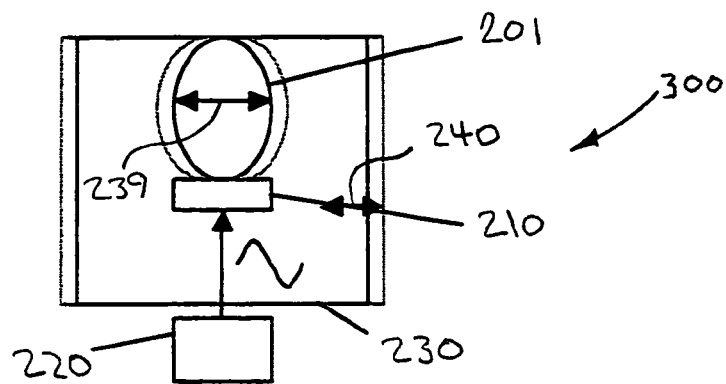
FIG. 16 is a semi-schematic diagram illustrating operation of a vibrator according to one embodiment of the present invention.

Referring now to FIG. 16, an optical element of a camera can be moved back and forth so as to generate substantial vibration. Sufficient vibration can be generated so as to be felt. This vibration can thus be used as a vibration ring to announce incoming calls, pages, text messages, email, alarms, and the like. Such vibration can be used for any reason that a conventional telephone vibrator is used for.

Indeed, the vibration can be modulated or made unique of each different kind of announcement. For example, continuous vibration can indicate an incoming telephone call, short pulses of vibration can indicate a page, and long pulses of vibration can indicate an email or text message.

Thus, the motor or actuator associated with the focus, autofocus, zoom, or other mechanism of a miniature camera can be used to provide ring vibration. The motor or actuator can be moved or actuated in a back and forth fashion (whether linear or rotary) in a manner that effects such vibration. The motor can be moving an optical element of the miniature camera, for example. The optical element can serve as a reaction mass to effect such vibration.

Examples of optical elements that can be move to effect such vibration include lenses, lens assemblies, shutters, irises, and image stabilization elements. The motor or actuator that effect movement of such optical elements during their normal functions can also generate vibration. Thus, a separate, dedicated, vibrator for a cellular telephone is not required and the cost of manufacturing the cellular telephone is reduced.

As shown in FIG. 16, a movable optical element 201 inside of a camera 300 moves so as to generate vibration. Optical element 201 can be mounted on an actuator 210 that effects such movement. Motion control electronics 220 can control actuator 210. Motion control electronics effect back and forth movement of actuator 210 so as to generate vibration of camera housing 230.

More particularly, actuator 210 can be commanded by motion control electronics 220 to move optical element 201 rapidly back and forth, such as in a sinusoidal reciprocating motion as indicated by double headed arrows 239 and 240. Camera housing 230 is caused to vibrate in response to this motion. Vibration from camera housing 230 is transmitted to the cellular telephone 400 (FIG. 18) within which miniature camera 300 is disposed. Vibration of cellular telephone 400 can be felt, so as to indicate ringing of cellular telephone 400.

Figure 17:
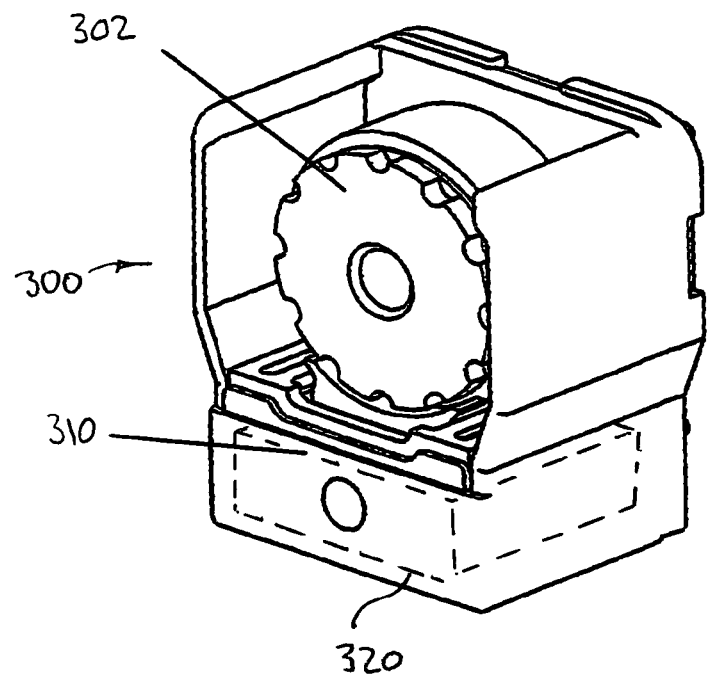
FIG. 17 is a semi-schematic, perspective view of a miniature camera according to one embodiment of the present invention.

Referring now to FIG. 17, according to one embodiment of the present invention, miniature camera 300 can comprise a lens assembly 302 that is moved by an actuator, such as the Lorentz actuator 320 described above. In this instance, the movable optical element is lens assembly 302. Thus, rapidly reciprocating movement of lens assembly 302 effected by actuator 320 results in vibration of miniature camera 300, and consequently of cellular telephone 400, as well. Lens assembly 302 can also be used for autofocus and/or zoom.

A lens of lens assembly 302 can, for example, be approximately 7 to 8 mm in diameter and can weigh approximately 0.3 to 0.5 gram. Other parameters for such lenses are likewise suitable.

A Lorentz actuator, a voice coil actuator, or any other type of actuator or motor that is suitable for use in a miniature camera can be used to provide ring vibration according of one or more embodiments of the present invention. For example, a voice coil actuator having movable parts that weigh approximately 0.3 grams can be used. Thus, a total moving mass of approximately 0.8 grams can be effective in providing suitable vibration.

Thus, the lens assembly 302 has dual functions. It can be used to take photographs and it can serve as at least a portion of a reaction mass for a ring vibrator. When used as a vibrator, lens assembly 302 can be caused to move back and forth in a periodic motion over a range of approximately 100 microns to approximate 500 microns at a frequency of approximately 10 Hz to approximately 200 Hz, for example. The current draw of the actuator can be from approximately 50 mA to approximately 200 mA at a voltage of approximately 2 volts to approximately 3 volts.

Figure 18:
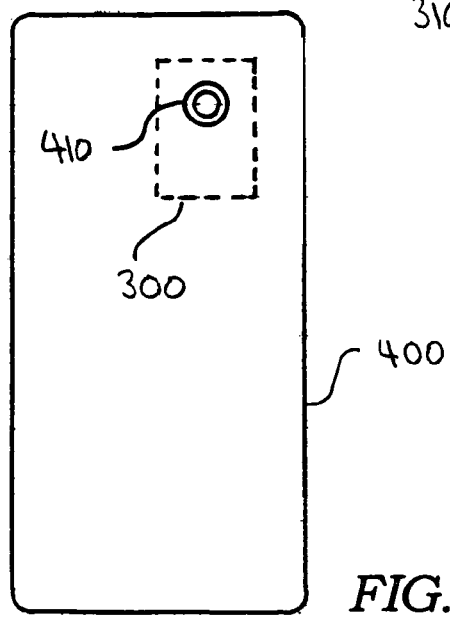
FIG. 18 is a semi-schematic, front view of a cellular telephone having a miniature camera that is configured so as to provide a telephone vibrator, according to one embodiment of the present invention.

Referring now to FIG. 18, a cellular telephone 400 comprises a miniature camera 300 that is configured to provide ring vibration. Lens or window 410 admits light into camera 300 for imaging. Vibration of camera 300, such as do to rapid reciprocation of a component thereof, results in vibration of cellular telephone 400.

Any movable part of a miniature camera can serve as a reaction mass to provide such vibration. Thus, the reaction mass does not have to comprise a lens or lens assembly.

The terms "actuator" and "motor" can be used interchangeably herein. In each instance, they refer to a device that converts electrical energy into mechanical movement. Whether the mechanical movement is linear or rotary, it can be used to provide vibration according to one or more embodiments of the present invention.

The vibrator of the present invention can be used in devices other than cellular telephones. Discussion herein as being for use in cellular telephones is by way of example only, and not by way of limitation. For example, the vibrator of the present invention can be used in personal digital assistants (PDAs), tablet computers, pocket. computers, and the like, whether or not such devices have built in telephones.

When no telephone is present, the vibrator of the present invention can be use as an alarm, for example. Thus, the vibrator can indicate when battery power is low, when a time has been reached (like an alarm clock), and/or when an email has been received, for example.

By using a vibrator according to one or more embodiments of the present invention, the need for a separate, dedicated vibrator is mitigated. Thus, the costs, weight, a volume associated with the use of a dedicate vibration can be eliminated.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method comprising:
   ringing a cellular telephone; and
   wherein ringing the cellular telephone comprises moving an optical component of a camera of the cellular telephone so as to cause the vibration.

2. The method as recited in claim 1, wherein the camera is a miniature camera that is attached to the cellular telephone.

3. The method as recited in claim 1, wherein moving a component of a camera comprises moving at least one lens of the camera.

4. The method as recited in claim 1, wherein moving a component of a camera comprises moving a component of a camera in a generally linear reciprocating fashion.

5. The method as recited in claim 1, wherein moving a component of a camera comprises moving the component with an actuator.

6. The method as recited in claim 1, wherein moving a component of a camera comprises moving the component in a manner that uniquely identifies at least one of an incoming call, a page, and a text message.

7. The method as recited in claim 1, wherein moving a component of a camera comprises moving the component at a frequency of between approximately 10 Hz and approximately 200 Hz.

8. The method as recited in claim 1, wherein moving a component of a camera comprises moving the component a distance of between approximately 100 microns and approximately 500 microns.

9. A ringer for a cellular telephone, the ringer comprising:
   a camera;
   a movable optical component within the camera;
   an actuator; and
   a control for causing the actuator to effect back and forth movement of the optical component so as to ring the cellular telephone by causing vibration.

10. The ringer as recited in claim 9, wherein the actuator is a linear actuator.

11. The ringer as recited in claim 9, wherein the control comprises control electronics configured to command the actuator to move in a reciprocating motion.

12. The ringer as recited in claim 9, wherein the actuator is configured to move in a linear reciprocating fashion.

13. The ringer as recited in claim 9, wherein the movable component is a lens of the camera.

14. The ringer as recited in claim 9, wherein the control comprises control electronics configured to effect vibration that uniquely identifies at least one of an incoming call, a page, and a text message.

15. The ringer as recited in claim 9, wherein the controller is configured to move the component at a frequency of between approximately 10 Hz and approximately 200 Hz.

16. The ringer as recited in claim 9, wherein the component is configured to move a distance of between approximately 100 microns and approximately 500 microns.

* * * * *